(12) United States Patent
Sun

(10) Patent No.: US 11,608,349 B2
(45) Date of Patent: Mar. 21, 2023

(54) PREPARATION AND APPLICATION OF MIXED-LIGAND NICKEL(II) COMPLEX CONTAINING BISOXAZOLINE-DERIVED NITROGEN HETEROCYCLIC CARBENE LIGAND AND PHOSPHITE LIGAND

(71) Applicant: SOOCHOW UNIVERSITY, Suzhou (CN)

(72) Inventor: Hongmei Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/629,384

(22) PCT Filed: Jul. 28, 2020

(86) PCT No.: PCT/CN2020/105313
§ 371 (c)(1),
(2) Date: Jan. 23, 2022

(87) PCT Pub. No.: WO2021/018157
PCT Pub. Date: Feb. 4, 2021

(65) Prior Publication Data
US 2022/0275014 A1    Sep. 1, 2022

(30) Foreign Application Priority Data

Jul. 28, 2019 (CN) .......................... 201910686014.6

(51) Int. Cl.
*C07F 15/04* (2006.01)
*B01J 31/24* (2006.01)

(52) U.S. Cl.
CPC ............... *C07F 15/04* (2013.01); *B01J 31/24* (2013.01); *B01J 2231/4205* (2013.01); *B01J 2531/847* (2013.01)

(58) Field of Classification Search
None
See application file for complete search history.

(56) References Cited

FOREIGN PATENT DOCUMENTS

| CN | 105859795 A | 8/2016 |
|---|---|---|
| CN | 106279297 A | 1/2017 |
| CN | 107312113 A | 11/2017 |
| CN | 110305171 A | 10/2019 |

OTHER PUBLICATIONS

Luy et al., "Rhodium(I) and Iridium(I) complexes of the conformationally rigid IBioxMe4 ligand: computational and experimental studies of unusually titled NHC coordination geometries," Organometallics, vol. 34, No. 20, pp. 5099-5112 (Dec. 31, 2015).

*Primary Examiner* — Yun Qian
(74) *Attorney, Agent, or Firm* — SZDC Law P.C.

(57) ABSTRACT

The invention discloses a mixed Ni(II) complex containing bisoxazoline-derived nitrogen heterocyclic carbene ligand and phosphite ligand and application thereof; the chemical formula of the mixed Ni(II) complex is Ni(NHC)[P(OR)$_3$]X$_2$, wherein R is ethyl or isopropyl, X is bromine or chlorine, and NHC is a bisoxazoline-derived nitrogen heterocyclic carbene ligand. In the presence of magnesium shavings, the mixed Ni(II) complex containing bisoxazoline-derived nitrogen heterocyclic carbene ligand and phosphite ligand of the present invention can catalyze low-activity chlorinated aromatic hydrocarbons and fluorinated aromatic hydrocarbons with chlorinated benzyl compounds, respectively, reductive cross-coupling reaction at a single temperature, generating a diarylmethane compound in one step, providing a new method for the synthesis of diarylmethane compounds.

6 Claims, No Drawings

PREPARATION AND APPLICATION OF MIXED-LIGAND NICKEL(II) COMPLEX CONTAINING BISOXAZOLINE-DERIVED NITROGEN HETEROCYCLIC CARBENE LIGAND AND PHOSPHITE LIGAND

This application is the National Stage Application of PCT/CN2020/105313, filed on Jul. 28, 2020, which claims priority to Chinese Patent Application No. 201910686014.6, filed on Jul. 28, 2019, which is incorporated by reference for all purposes as if fully set forth herein.

TECHNICAL FIELD

The invention relates to the nickel (II) complex, and in particular relates to the preparation of a mixed nickel (II) complex containing bisoxazoline-derived nitrogen heterocyclic carbene ligand and a phosphite ligand. The catalyst catalyzes the reductive cross-coupling reaction of chlorinated aromatic hydrocarbons and fluorinated aromatic hydrocarbons with benzyl chloride compounds at a single temperature in the presence of magnesium chips to synthesize diarylmethane compounds in one step.

BACKGROUND TECHNIQUE

As an important structural unit, diarylmethane compounds are widely present in organic functional materials and pharmaceutical active molecules, and have important synthetic values. The cross-coupling reaction of nucleophiles and electrophiles catalyzed by transition metals is the traditional method for synthesizing such compounds, but this method usually requires the direct use of metal organic reagents with flammable hazards, such as organozinc reagents and Grignard reagents, etc.

In recent years, the reductive cross-coupling reaction of amphiphilic reagents has become a new method for synthesizing diarylmethane compounds, which has attracted the attention of the industry, because this method can avoid the direct use of metal organic reagents with flammable hazards. Better step economics, while also improving the functional group tolerance of the reaction. For example, in 2012, Peng Yu's research group reported that a catalyst composed of nickel dichloride, pyridine and zinc powder catalyzed the reductive cross-coupling reaction of iodinated aromatic hydrocarbons and brominated alkanes, but only involved p-methoxyiodine. An example of reductive cross-coupling reaction of benzene and benzyl bromide to obtain the corresponding diarylmethane compound, while the amount of catalyst is large (30%), and the zinc powder is greatly excessive (see: Yan, C.-S.; Peng, Y.; Xu, X.-B.; Wang, Y.-W. Chem. Eur. J. 2012, 18, 6039). In 2014, Love's research group used bis(triethylphosphine) nickel dichloride as a catalyst to prepare a benzyl zinc reagent through the reaction of benzyl chloride and zinc powder, and then react with fluorine with imine-directing groups on the benzene ring. The benzene reaction can synthesize diarylmethane compounds in a higher yield. The entire process requires stepwise feeding at different temperatures to make the reaction proceed smoothly, and only one case of the benzyl chloride substrate is involved, and an imine-directing group is required to activate the carbon-fluorine bond (see: Sun, A D; Leung, K.; Restivo, A D; LaBerge, N A; Takasaki, H.; Love, J A. Chem. Eur. J. 2014, 20, 3162). In 2015, the Weix research team reported that in the presence of zinc powder, Ni(II) bromide trihydrate was used as the main catalyst, and cobalt piperazine was used as the co-catalyst. The diarylmethane compounds are synthesized by joint reaction, but if benzyl alcohol is replaced with benzyl chloride, only the self-coupling product of the latter can be obtained. At the same time, this method is not suitable for cheap, easy-to-obtain, low-activity chlorinated aromatics. It also requires step-by-step feeding to successfully complete (see: Ackerman, L K G; Anka-Lufford, L L; Naodovic, M.; Weix, D J. Chem. Sci. 2015, 6, 1115). In 2016, Gong Hegui's research group reported that in the presence of zinc powder, nickel diiodide and bipyridine were used to form a catalytic system to achieve the reductive cross-coupling reaction of bromoaromatic hydrocarbons and benzyl chloride compounds. Brominated aromatic hydrocarbons also need to add different additives, and it is not suitable for cheap, easy-to-obtain, low-activity chlorinated aromatic hydrocarbons (see: Zhang, Q C; Wang, X.; Qian, Q.; Gong, H G. Synthesis, 2016, 48, 2829). In 2016, the inventor's group reported that the mixed-ligand nickel (II) complex of nitrogen-containing heterocyclic carbene ligands and phosphine ligands realized the reduction cross-coupling of chlorinated aromatic hydrocarbons and chlorinated benzyl compounds in the presence of magnesium shavings. However, this synthesis method needs to be carried out at elevated temperatures in stages, that is, the reaction is performed at a low temperature for a period of time, and then the temperature is raised to the required reaction temperature to complete the subsequent cross-coupling reaction. If the low-temperature reaction process is not passed, the cross-coupling reaction is directly performed. The reaction at the joint reaction temperature will result in the formation of more self-coupling products of chlorinated benzyl compounds, which cannot achieve the purpose of convenient and efficient synthesis of diarylmethane compounds (see: Zhang, J.; Lu, G S; Xu, J.; Sun, H M; Shen, Q. Org. Lett. 2016, 18, 2860).

The complex catalytic reaction system, stepwise heating or stepwise feeding and other conditions in the prior art are not conducive to large-scale industrial applications. Therefore, the design and synthesis of a new type of nickel (II) complex with a clear structure can effectively inhibit the self-coupling reaction of chlorinated benzyl compounds, and efficiently catalyze low-activity chlorinated aromatic hydrocarbons and fluorinated aromatic hydrocarbons with chlorinated benzyl compounds at a single temperature. The reduction cross-coupling reaction below is innovative and has potential industrial application value.

TECHNICAL PROBLEMS

It is an object of the present invention to provide a mixed Ni(II) complex containing bisoxazoline-derived nitrogen heterocyclic carbene ligand and phosphite ligand, which can catalyze at a single temperature in the presence of magnesium shavings reductive cross-coupling reactions of low-activity chlorinated aromatic hydrocarbons and fluorinated aromatic hydrocarbons with chlorinated benzyl compounds to synthesize diarylmethane compounds in one step. Its catalytic activity and substrate applicability are equivalent to or higher than those of the prior art. The operability is also significantly better than the existing technology.

TECHNICAL SOLUTIONS

In order to achieve the above object, the technical scheme adopted by the present invention is: mixed Ni(II) complex containing bisoxazoline-derived nitrogen heterocyclic carbene ligand and phosphite ligand, the general structure of which is as follows shown.

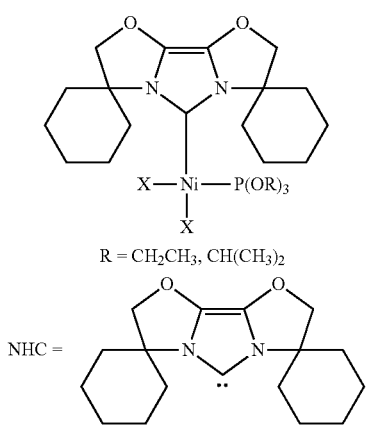

wherein, X is bromine or chlorine.

The chemical formula of the mixed Ni(II) complex containing bisoxazoline-derived nitrogen heterocyclic carbene ligand and phosphite ligand of the present invention is Ni(NHC)[P(OR)$_3$]X$_2$, R is ethyl or isopropyl, X is bromine or chlorine. NHC is a bisoxazoline-derived nitrogen heterocyclic carbene ligand.

The preparation method of the above-mentioned mixed Ni(II) complex containing bisoxazoline-derived nitrogen heterocyclic carbene ligand and phosphite ligand includes the following steps:

The bis(phosphite) Ni(II) dibromide and NHC to obtain the mixed Ni(II) complex containing bisoxazoline-derived nitrogen heterocyclic carbene ligand and phosphite ligand.

The bis(phosphite) Ni(II) dichloride and NHC to obtain the mixed Ni(II) complex containing bisoxazoline-derived nitrogen heterocyclic carbene ligand and phosphite ligand.

In the present invention, the mixed Ni(II) complex containing bisoxazoline-derived nitrogen heterocyclic carbene ligand and phosphite ligand is carried out in the solvent without active hydrogen, such as tetrahydrofuran.

In the above technical scheme, the bis(phosphite) nickel dibromide (II) is di(triethyl phosphite) nickel dibromide (II) or di(triisopropyl phosphite) nickel dibromide (II); the bis(phosphite) nickel dichloride (II) is di(triethyl phosphite) nickel dichloride (II) or di(triisopropyl phosphite) nickel dichloride (II).

The preparation of the mixed Ni(II) complex containing bisoxazoline-derived nitrogen heterocyclic carbene ligand and phosphite ligand is specifically as follows.

When X is the bromine, the method for preparing the above-mentioned mixed nickel (II) complex is to dissolve di(triethyl phosphite) nickel dibromide (II) and NHC in tetrahydrofuran in the inert gas, at room temperature has reacted for 3 to 4 hours; the solvent is removed in vacuum, the residue is washed with n-hexane, and extracted by toluene, and the clear liquid is transferred, and solvent toluene is removed, to obtain nickel (II) complex, that is the mixed Ni(II) complex containing bisoxazoline-derived nitrogen heterocyclic carbene ligand and phosphite ligand.

When X is the chlorine, the method for preparing the above-mentioned mixed nickel (II) complex is to dissolve di(triethyl phosphite) nickel dichloride (II) and NHC in tetrahydrofuran in the inert gas, at room temperature has reacted for 3 to 5 hours; the solvent is removed in vacuum, the residue is washed with n-hexane, and extracted by toluene, and the clear liquid is transferred, and solvent toluene is removed, to obtain nickel (II) complex, that is the mixed Ni(II) complex containing bisoxazoline-derived nitrogen heterocyclic carbene ligand and phosphite ligand.

In the above technical scheme, the inert gas is argon; the molar ratio of bis(phosphite) nickel dibromide (II) to NHC is 1 to 1; the molar ratio of bis(phosphite) nickel dichloride (II) to NHC is 1 to 1.

The invention also discloses the above-mentioned mixed Ni(II) complex containing bisoxazoline-derived nitrogen heterocyclic carbene ligand and phosphite ligand as a one-component catalyst in catalyzing the reaction of halogenated aromatic hydrocarbons and chlorinated benzyl compounds. Preferably, the application is performed in the next step at a single temperature in the presence of magnesium shavings; the catalyst is used in the amount of 1% to 2% by mole of halogenated aromatics. The mixed Ni(II) complex containing bisoxazoline-derived nitrogen heterocyclic carbene ligand and phosphite ligand is used as a one-component catalyst to catalyze the reaction of halogenated aromatic hydrocarbons and chlorinated benzyl compounds to prepare diarylmethanes compound; The preparation is a one-step synthesis; the reaction temperature of halogenated aromatic hydrocarbons and chlorinated benzyl compound is at 40° C. to 65° C. for 1 to 12 hours.

The present invention further discloses a method for preparing diarylmethane compounds, including the following steps. The catalyst, magnesium chips, halogenated aromatic hydrocarbons, chlorinated benzyl compounds, and solvents are sequentially added to a reaction flask in the inert gas atmosphere. The catalyst is the mixed Ni(II) complex containing bisoxazoline-derived nitrogen heterocyclic carbene ligand and phosphite ligand.

Preferably, after the reaction, the reaction is terminated with a saturated ammonium chloride solution, the reaction product is extracted with ethyl acetate, and separated and purified by column chromatography to obtain the product diarylmethane compound, which can be quantitatively analyzed.

In the above technical solution, the inert gas is argon; the solvent is tetrahydrofuran.

In the above technical scheme, the reaction temperature for preparing the diarylmethane compound is at 40° C. to 65° C. for 1 to 12 hours. Preferably, when the halogenated aromatic hydrocarbon is the chlorinated aromatic hydrocarbon, the reaction temperature is at 50° C. for 1 h.

In the above technical solution, the halogenated aromatic hydrocarbon is a chlorinated aromatic hydrocarbon or a fluorinated aromatic hydrocarbon; the chlorinated aromatic hydrocarbon may be chlorobenzene, p-methylchlorobenzene, p-methoxychlorobenzene, p-tert-butylchlorobenzene, fluorochlorobenzene, p-trifluoromethylchlorobenzene, o-methylchlorobenzene, o-fluorochlorobenzene, 2,6-dimethylchlorobenzene, 2,6-diethylchlorobenzene, m-dimethylaminochlorobenzene, 4-(2-methyl-1,3-dioxolane-2-yl)chlorobenzene, 1-chloronaphthalene, 6-chloro-N-methylindole; the fluoroaromatic hydrocarbon may be fluorobenzene, P-methylfluorobenzene, p-methoxyfluorobenzene, o-methylfluorobenzene, 1-fluoronaphthalene.

In the above technical solution, the benzyl chloride compound may be benzyl chloride, p-methyl benzyl chloride, p-methoxybenzyl chloride, p-tert-butyl benzyl chloride, p-fluorobenzyl chloride, or o-methyl benzyl chloride.

In the above technical scheme, the molar ratio of the catalyst, magnesium chips, halogenated aromatic hydrocarbons, and benzyl chloride compounds is 0.01 to 0.02:1.2:1:1.2. According to the embodiment of the present invention, when the chlorinated aromatic hydrocarbon is chlorobenzene and the chlorinated benzyl compound is p-methyl benzyl chloride, the amount of p-methyl benzyl chloride is 1.2 times that of chlorobenzene in terms of the amount of the substance. The dosage is 1.2 times that of chlorobenzene, the amount of catalyst is 1 mol %, the amount of solvent tetrahydrofuran is 1 ml, the reaction temperature is 50° C., the reaction time is 1 hour, at a mild reaction temperature, less catalyst dosage and shorter under the reaction time, 4-methyldiphenylmethane can be obtained with the separation yield of 94%; when the fluoroaromatic hydrocarbon is fluorobenzene and the chlorinated benzyl compound is p-methylbenzyl chloride, based on the amount of substance, p-methyl, the amount of benzyl chloride is 1.2 times that of chlorobenzene, the amount of magnesium chips is 1.2 times that of chlorobenzene, the amount of catalyst is 2 mol %, the amount of solvent tetrahydrofuran is 1 ml, the reaction temperature is 50° C., and the reaction time is 10 hours. It can obtain 4-methyldiphenylmethane with a separation yield of 92% under low reaction temperature, small amount of catalyst and short reaction time.

The preparation of diarylmethane compounds can use cheap and easily available chlorinated hydrocarbons or low-activity fluorinated aromatic hydrocarbons as reaction substrates. In particular, the reaction can be successfully completed at a single temperature, which simplifies the operability of the reaction, Improve the potential industrial application value.

The above reaction for preparing diarylmethane compounds can be expressed as follows:

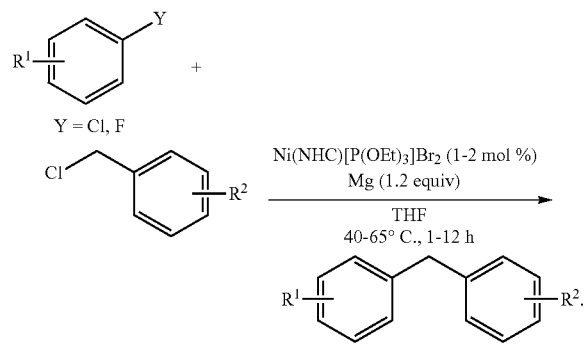

Beneficial Effect

Due to the application of the above technical solutions, the present invention has the following advantages compared with the prior art.

(1) The present invention uses cheap and easily available bis(phosphite) nickel dibromide (II) or bis(phosphite) nickel dichloride (II) is as the nickel raw material, with NHC at room temperature and normal pressure to prepare a mixed Ni(II) complex containing bisoxazoline-derived nitrogen heterocyclic carbene ligand and phosphite ligand. The reaction is simple and easy to operate, and the product is easy to purify. And the yield is high. The new Ni(II) complex has specific structure, which is the solid has air-stable to conducive to large-scale synthesis and application.

(2) The mixed Ni(II) complex containing bisoxazoline-derived nitrogen heterocyclic carbene ligand and phosphite ligand disclosed in the present invention can efficiently catalyze low-activity chlorinated aromatic hydrocarbons or fluorocarbons in the presence of magnesium chips to react cross-coupling reaction with benzyl chloride compounds. Synthesis the diarylmethanes compounds has one-step. The catalytic activity of that is or higher than the one of the nickel catalyst, which is reported nowadays. At the same time, the synthesis method has no step temperature increasing. Reaction at a temperature of zero degrees or lower, and then heat to a specific temperature to complete the subsequent cross-coupling reaction, but can achieve conversion through a one-step reaction at a mild single reaction temperature.

EMBODIMENTS OF THE INVENTION

The method provided by the present invention uses the air-stable new nickel (II) complex $Ni(NHC)[P(OR)_3]X_2$ as a catalyst for the first time at a single temperature, and directly uses two halogenated hydrocarbons under the action of magnesium chips as a substrate, diarylmethane compounds are synthesized efficiently through a one-step reaction. Compared with the prior art, the synthesis method provided by this patent does not require staged heating reaction, that is, the reaction is performed at a temperature of zero or lower for a period of time, and then the temperature is raised to a specific temperature to complete the reaction, but can be performed in a gentle single reaction At temperature, a new mixed nickel (II) complex is as a catalyst, and diarylmethane compounds are directly generated in one step through the reduction cross-coupling reaction of two halogenated hydrocarbons in the presence of magnesium chips. The mixed nickel (II) complex provided by the present invention can not only effectively inhibit the self-coupling reaction of two halogenated hydrocarbons, but also efficiently catalyze their reductive cross-coupling reaction. The activity is equivalent or higher. This is based on a mixed-type nickel (II) complex containing a bisoxazoline-derived nitrogen heterocyclic carbene ligand and a phosphite ligand as a catalyst, passing through two halogenated hydrocarbons at a single temperature in the presence of magnesium shavings The reductive cross-coupling reaction is the first example of one-step synthesis of diarylmethanes compounds.

The present invention will be further described below in conjunction with examples. The raw materials involved are all from the prior art, purchased commercially or prepared according to the existing literature:

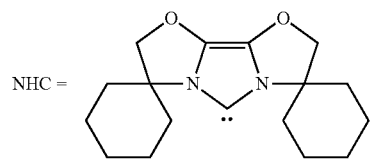

Example 1: Synthesis of Ni (NHC)[P(OR)$_3$]X$_2$ (R=CH$_2$CH$_3$, X=Br)

Under argon protection, added NHC (0.2884 g, 1.0 mmol) to di(triethyl phosphite) nickel dibromide (II) (0.5508 g, 1.0 mmol) in tetrahydrofuran had reacted at room temperature for 3 hours. Then the solvent had been removed in vacuum, the residue had been washed with n-hexane, and the obtained residue had been extracted by toluene, and the clear liquid had been transferred, and solvent toluene had been removed to obtain the yellow solid, wherein the yield is 87%.

The results of elemental analysis of the product are shown in Table 1:

TABLE 1

Elemental analysis results

|  | C: (%) | H: (%) | N: (%) |
| --- | --- | --- | --- |
| Theoretical value | 41.04 | 5.84 | 4.16 |
| Actual value | 41.11 | 5.88 | 4.13 |

The product was subjected to nuclear magnetic characterization and the results are as follows:

The product was dissolved in $C_6D_6$ (ca. 0.4 mL), sealed, and characterized by Unity Inova-400 NMR apparatus at room temperature: $^1H$ NMR (400 MHz, $C_6D_6$): δ 4.86. (s, 4H), 4.31 (q, J=6.8 Hz, 6H), 2.54-2.48 (m, 2H), 2.28-2.24 (m, 2H), 2.12-1.97 (m, 8H), 1.70-1.39 (m, 4H), 1.28-1.25 (m, 4H), 1.26 (t, J=7.0 Hz, 9H) ppm.

Example 2: Synthesis of Ni(NHC)[P(OR)$_3$]X$_2$ (R=CH(CH$_3$)$_2$, X=Br)

Under argon protection, added NHC (0.2884 g, 1.0 mmol) to di(triisopropyl phosphite) nickel dibromide (II) (0.6350 g, 1.0 mmol) in tetrahydrofuran had reacted at room temperature for 4 hours. Then the solvent had been removed in vacuum, the residue had been washed with n-hexane, and the obtained residue had been extracted by toluene, and the clear liquid had been transferred, and solvent toluene had been removed to obtain the yellow solid, wherein the yield is 82%.

The results of elemental analysis of the product are shown in Table 2:

TABLE 2

Elemental analysis

|  | C: (%) | H: (%) | N: (%) |
| --- | --- | --- | --- |
| Theoretical value | 43.67 | 6.34 | 3.92 |
| Actual value | 43.74 | 6.39 | 3.89 |

The product was subjected to nuclear magnetic characterization and the results are as follows:

The product was dissolved in $C_6D_6$ (ca. 0.4 mL), sealed, and characterized by Unity Inova-400 NMR apparatus at room temperature: $^1H$ NMR (400 MHz, $C_6D_6$): δ 4.91(s, 4H), 4.79 (dq, J=12.0, 6.0 Hz, 3H), 2.59-2.49 (m, 2H), 2.31-2.26(m, 2H), 2.18-2.01 (m, 8H), 1.79-1.50 (m, 4H), 1.30-1.25(m, 4H), 1.18 (d, J=6.5 Hz, 18H) ppm.

Example 3: Synthesis of Ni(NHC)[P(OR)$_3$]X$_2$ (R=CH$_2$CH$_3$, X=Cl)

Under argon protection, added NHC (0.2884 g, 1.0 mmol) to di(triethyl phosphite) nickel dichloride (II) (0.4619 g, 1.0 mmol) in tetrahydrofuran had reacted at room temperature for 3 hours. Then the solvent had been removed in vacuum, the residue had been washed with n-hexane, and the obtained residue had been extracted by toluene, and the clear liquid had been transferred, and solvent toluene had been removed to obtain the yellow solid, wherein the yield is 80%.

The results of elemental analysis of the product are shown in Table 3:

TABLE 3

Elemental analysis

|  | C: (%) | H: (%) | N: (%) |
| --- | --- | --- | --- |
| Theoretical value | 47.29 | 6.73 | 4.80 |
| Actual value | 47.39 | 6.78 | 4.76 |

The product was subjected to nuclear magnetic characterization and the results are as follows:

The product was dissolved in $C_6D_6$ (ca. 0.4 mL), sealed, and characterized by Unity Inova-400 NMR apparatus at room temperature: $^1H$ NMR (400 MHz, $C_6D_6$): δ 4.97 (s, 4H), 4.39 (q, J=6.0 Hz, 6H), 2.50-2.44 (m, 2H), 2.30-2.23 (m, 2H), 2.03-1.89 (m, 8H), 1.71-1.38 (m, 4H), 1.29-1.23(m, 4H), 1.19 (t, J=6.9 Hz, 9H) ppm.

Example 4: Synthesis of Ni(NHC)[P(OR)$_3$]X$_2$ (R=CH(CH$_3$)$_2$, X=Cl)

Under argon protection, added NHC (0.2884 g, 1.0 mmol) to di(triisopropyl phosphite) nickel dichloride (II) (0.5460 g, 1.0 mmol) in tetrahydrofuran had reacted at room temperature for 5 hours. Then the solvent had been removed in vacuum, the residue had been washed with n-hexane, and the obtained residue had been extracted by toluene, and the clear liquid had been transferred, and solvent toluene had been removed to obtain the yellow solid, wherein the yield is 80%.

The results of elemental analysis of the product are shown in Table 4:

TABLE 4

Elemental analysis

|  | C: (%) | H: (%) | N: (%) |
| --- | --- | --- | --- |
| Theoretical value | 49.87 | 7.24 | 4.47 |
| Actual value | 49.98 | 7.29 | 4.42 |

The product was subjected to nuclear magnetic characterization and the results are as follows:

The product was dissolved in $C_6D_6$ (ca. 0.4 mL), sealed, and characterized by Unity Inova-400 NMR apparatus at room temperature: $^1H$ NMR (400 MHz, $C_6D_6$): δ 4.99 (s, 4H), 4.90 (dq, J=12.80, 5.4 Hz, 3H), 2.62-2.48 (m, 2H), 2.30-2.26 (m, 2H), 2.21-2.00 (m, 8H), 1.74-1.51 (m, 4H), 1.35-1.26 (m, 4H), 1.15 (d, J=7.0 Hz, 18H) ppm.

Example 5: Ni(NHC)[P(OR)$_3$]X$_2$(R=CH$_2$CH$_3$, X=Br) Catalyzed Cross-Coupling Reaction of Chlorobenzene and p-methylbenzyl chloride Under argon protection, catalyst (3.4 mg, 0.005 mmol, 1 mol %), magnesium chips (14.5 mg, 0.6 mmol), chlorobenzene (51 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), and the separation yield was 94%, and the gas phase yield was 99%. The following examples were all separation yields.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.30-7.21 (m, 2H), 7.19-7.12(m, 3H), 7.07 (s, 4H), 3.92 (s, 2H), 2.29 (s, 3H) ppm.

Example 6: Ni(NHC)[P(OR)$_3$]X$_2$(R=CH$_2$CH$_3$, X=Br) Catalyzed Cross-Coupling Reaction of p-methylchlorobenzene and p-methylbenzyl chloride Under argon protection, catalyst (3.6 mg, 0.005 mmol, 1 mol %), magnesium chips (14.5 mg, 0.6 mmol), p-methylchlorobenzene (54 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), the yield was 92%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.06 (s, 8H), 3.88 (s, 2H), 2.29 (s, 6H) ppm.

Example 7: Ni(NHC)[P(OR)$_3$]X$_2$ (R=CH$_2$CH$_3$, X=Br) Catalyzed Cross-Coupling Reaction of p-methoxychlorobenzene and p-methylbenzyl chloride Under argon protection, catalyst (3.4 mg, 0.005 mmol, 1 mol %), magnesium chips (14.5 mg, 0.6 mmol), p-methoxychlorobenzene (61 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), the yield was 95%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.15-7.00 (m, 6H), 6.81 (d, J=8.6 Hz, 2H), 3.87 (s, 2H), 3.75 (s, 3H), 2.30 (s, 3H) ppm.

Example 8: Ni(NHC)[P(OR)$_3$]X$_2$ (R=CH$_2$CH$_3$, X=Br) Catalyzed Cross-Coupling Reaction of p-tert-butylchlorobenzene and p-methylbenzyl chloride Under argon protection, catalyst (3.4 mg, 0.005 mmol, 1 mol %), magnesium chips (14.5 mg, 0.6 mmol), p-tert-butylchlorobenzene (84 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (the mixed solvent with the volume ratio of ethyl acetate/petroleum was 1:100 as developing solvent), and the yield was 94%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.28 (d, J=8.3 Hz, 2H), 7.13-7.06 (m, 6H), 3.90 (s, 2H), 2.30 (s, 3H), 1.29 (s, 9H) ppm.

Example 9: Ni(NHC)[P(OR)$_3$]X$_2$(R=CH$_2$CH$_3$, X=Br) Catalyzed Cross-Coupling Reaction of p-fluorochlorobenzene and p-methylbenzyl chloride Under argon protection, catalyst (3.4 mg, 0.005 mmol, 1 mol %), magnesium chips (14.5 mg, 0.6 mmol), p-fluorochlorobenzene (54 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), and the yield was 93%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.15-6.99 (m, 6H), 6.98-6.89 (m, 2H), 3.88 (s, 2H), 2.30 (s, 3H) ppm.

Example 10: Ni(NHC)[P(OR)$_3$]X$_2$ (R=CH$_2$CH$_3$, X=Br) Catalyzed Cross-Coupling Reaction of p-trifluoromethylchlorobenzene and p-methylbenzyl chloride Under argon protection, catalyst (3.4 mg, 0.005 mmol, 1 mol %), magnesium chips (14.5 mg, 0.6 mmol), p-trifluoromethylchlorobenzene (67 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), and the yield was 88%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.51 (d, J=8.0 Hz, 2H), 7.27 (d, J=7.9 Hz, 2H), 7.15-6.99 (m, 4H), 3.98 (s, 2H), 2.31 (s, 3H) ppm.

Example 11: Ni(NHC)[P(OR)$_3$]X$_2$ (R=CH$_2$CH$_3$, X=Br) Catalyzed Cross-Coupling Reaction of o-methylchlorobenzene and p-methylbenzyl chloride Under argon protection, catalyst (3.4 mg, 0.005 mmol, 1 mol %), magnesium chips (14.5 mg, 0.6 mmol), o-methylchlorobenzene (58 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), and the yield was 94%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.16-7.02 (m, 6H), 7.00-6.96(m, 2H), 3.92 (s, 2H), 2.29 (s, 3H), 2.22 (s, 3H) ppm.

Example 12: Ni(NHC)[P(OR)$_3$]X$_2$ (R=CH$_2$CH$_3$, X=Br) Catalyzed Cross-Coupling Reaction of o-fluorochlorobenzene and p-methylbenzyl chloride Under argon protection, catalyst (3.4 mg, 0.005 mmol, 1 mol %), magnesium chips (14.5 mg, 0.6 mmol), o-fluorochlorobenzene (53 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), and the yield was 89%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.19-7.06 (m, 6H), 7.04-6.96 (m, 2H), 3.98-3.89 (m, 2H), 2.29 (s, 3H) ppm.

Example 13: Ni(NHC)[P(OR)$_3$]X$_2$ (R=CH$_2$CH$_3$, X=Br) Catalyzed Cross-Coupling Reaction of 2,6-dimethylchlorobenzene and p-methylbenzyl chloride Under argon protection, catalyst (6.8 mg, 0.010 mmol, 2 mol %), magnesium chips (14.5 mg, 0.6 mmol), 2,6-dimethylchlorobenzene (66 μl, 0.5 mmol), p-methylbenzyl chloride (80 μl, 0.6 mmol), tetrahydrofuran (1.0 ml) were sequentially added to the reaction flask, and had reacted at 50° C. for 8 h, then had quenched with saturated ammonium chloride solution. The product was extracted with ethyl acetate and purified by column chromatography (with petroleum as a developing solvent), and the yield was 95%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.11-6.99 (m, 5H), 6.89 (d, J=7.6 Hz, 2H), 4.00 (s, 2H), 2.28 (s, 3H), 2.23 (s, 6H) ppm.

Example 14: Ni(NHC)[P(OR)$_3$]X$_2$ (R=CH$_2$CH$_3$, X=Br) Catalyzed Cross-Coupling Reaction of 2,6-diethylchlorobenzene and p-methylbenzyl chloride Under argon protection, catalyst (6.8 mg, 0.010 mmol, 2 mol %), magnesium chips (14.5 mg, 0.6 mmol), 2,6-diethylchlorobenzene (84.3 μl, 0.5 mmol), p-methylbenzyl chloride (80 μl, 0.6 mmol), tetrahydrofuran (1.0 ml) were sequentially added to the reaction flask, and had reacted at 50° C. for 10 h, then had quenched with saturated ammonium chloride solution. The product was extracted with ethyl acetate and purified by column chromatography (with petroleum as a developing solvent), and the yield was 89%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.19 (t, J=7.5 Hz, 1H), 7.06 (dd, J=27.9, 7.6 Hz, 4H), 6.88 (d, J=7.6 Hz, 2H), 4.06 (s, 2H), 2.57 (q, J=7.7 Hz, 4H), 2.28 (s, 3H), 1.12 (t, J=7.5 Hz, 6H) ppm.

Example 15: Ni(NHC)[P(OR)$_3$]X$_2$ (R=CH$_2$CH$_3$, X=Br) Catalyzed Cross-Coupling Reaction of meta-dimethylaminochlorobenzene and p-methylbenzyl chloride Under argon protection, catalyst (3.4 mg, 0.005 mmol, 1 mol %), magnesium chips (14.5 mg, 0.6 mmol), meta-dimethylaminochlorobenzene (70 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (the mixed solvent with the volume ratio of ethyl acetate/petroleum was 1:100 as developing solvent), and the yield was 96%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.15-7.02 (m, 5H), 6.60-6.50 (m, 3H), 3.88 (s, 2H), 2.86 (s, 6H), 2.28 (s, 3H) ppm.

Example 16: Ni(NHC)[P(OR)$_3$]X$_2$ (R=CH$_2$CH$_3$, X=Br) Catalyzed Cross-Coupling Reaction of 4-(2-methyl-1,3-dioxolane-2-yl) chlorobenzene and p-methylbenzyl chloride Under argon protection, catalyst (3.4 mg, 0.005 mmol, 1 mol %), magnesium chips (14.5 mg, 0.6 mmol), 4-(2-methyl-1,3-dioxolane-2-yl) chlorobenzene (99 mg, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (the mixed solvent with the volume ratio of ethyl acetate/petroleum was 1:100 as developing solvent), and the yield was 93%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.38 (d, J=8.1 Hz, 2H), 7.15 (d, J=8.1 Hz, 2H), 7.09 (s, 4H), 4.01 (t, J=6.8 Hz, 2H), 3.92 (s, 2H), 3.76 (t, J=6.8 Hz, 2H), 2.31 (s, 3H), 1.63 (s, 3H) ppm.

Example 17: Ni(NHC)[P(OR)$_3$]X$_2$ (R=CH$_2$CH$_3$, X=Br) Catalyzed Cross-Coupling Reaction of 1-chloronaphthalene and p-methylbenzyl chloride Under argon protection, catalyst (3.4 mg, 0.005 mmol, 1 mol %), magnesium chips (14.5 mg, 0.6 mmol), 1-chloronaphthalene (68 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (the mixed solvent with the volume ratio of ethyl acetate/petroleum was 1:50 as developing solvent), and the yield was 97%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 8.03-7.94 (m, 1H), 7.88-7.78 (m, 1H), 7.74-7.72 (m, 1H), 7.48-7.35 (m, 3H), 7.26-7.25 (m, 1H), 7.11-7.07 (m, 2H), 6.81-6.78 (m, 2H), 4.37 (s, 2H), 2.29 (s, 3H) ppm.

Example 18: Ni(NHC)[P(OR)$_3$]X$_2$ (R=CH$_2$CH$_3$, X=Br) Catalyzed Cross-Coupling Reaction of 6-chloro-N-methylindole and p-methylbenzyl chloride Under argon protection, catalyst (3.4 mg, 0.005 mmol, 1 mol %), magnesium chips (14.5 mg, 0.6 mmol), 6-chloro-N-methylindole (82.8 mg, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (the mixed solvent with the volume ratio of ethyl acetate/petroleum was 1:10 as developing solvent), and the yield was 93%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.50 (d, J=8.1 Hz, 1H), 7.24-7.14 (m, 4H), 7.09 (s, 1H), 6.95-6.92 (m, 2H), 6.38 (d, J=3.0 Hz, 1H), 4.10 (s, 2H), 3.67 (s, 3H)), 2.35 (s, 3H) ppm.

Example 19: Ni(NHC)[P(OR)$_3$]X$_2$ (R=CH$_2$CH$_3$, X=Cl) Catalyzed Cross-Coupling Reaction of chlorobenzene and p-methylbenzyl chloride Under argon protection, catalyst (2.9 mg, 0.005 mmol, 1 mol %), magnesium chips (14.5 mg, 0.6 mmol), chlorobenzene (51 μl, 0.5 mmol), p-methylbenzyl chloride (82 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (the mixed solvent with the volume ratio of ethyl acetate/petroleum was 1:100 as developing solvent), the yield was 85%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.30-7.20 (m, 2H), 7.15 (t, J=6.6 Hz, 3H), 7.07 (d, J=8.7 Hz, 2H), 6.84-6.75 (m, 2H), 3.89(s, 2H), 3.72 (s, 3H) ppm.

Example 20: Ni(NHC)[P(OR)$_3$]X$_2$ (R=CH$_2$CH$_3$, X=Cl) Catalyzed Cross-Coupling Reaction of chlorobenzene and p-tert-butylbenzyl chloride Under argon protection, catalyst (3.2 mg, 0.005 mmol, 1 mol %), magnesium chips (14.5 mg, 0.6 mmol), chlorobenzene (51 μl, 0.5 mmol), p-tert-butylbenzyl chloride (97 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), the yield was 84%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.31-7.20 (m, 4H), 7.19-7.10 (m, 3H), 7.13-7.06 (m, 2H), 3.93 (s, 2H), 1.29 (s, 9H) ppm.

Example 21: Ni(NHC)[P(OR)$_3$]X$_2$ (R=CH$_2$CH$_3$, X=Br) Catalyzed Cross-Coupling Reaction of chlorobenzene and o-methylbenzyl chloride Under argon protection, catalyst (3.4 mg, 0.005 mmol, 1 mol %), magnesium chips (14.5 mg, 0.6 mmol), chlorobenzene (51 μl, 0.5 mmol), o-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), the yield was 88%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.25 (t, J=7.4 Hz, 2H), 7.21-7.05 (m, 7H), 3.98 (s, 2H), 2.23 (s, 3H) ppm.

Example 22: Ni(NHC)[P(OR)$_3$]X$_2$ (R=CH$_2$CH$_3$, X=Br) Catalyzed Cross-Coupling Reaction of p-tert-butylchlorobenzene and benzyl chloride Under argon protection, catalyst (3.4 mg, 0.005 mmol, 1 mol %), magnesium chips (14.5 mg, 0.6 mmol), p-tert-butylchlorobenzene (84 μl, 0.5 mmol), benzyl chloride (69 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), the yield was 95%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.28 (dd, J=12.4, 7.8 Hz, 4H), 7.23-7.15(m, 3H), 7.11 (d, J=8.1 Hz, 2H), 3.95 (s, 2H), 1.30 (s, 9H) ppm.

Example 23: Ni(NHC)[P(OR)$_3$]X$_2$ (R=CH$_2$CH$_3$, X=Br) Catalyzed Cross-Coupling Reaction of p-tert-butylchlorobenzene and p-fluorochlorobenzyl Under argon protection, catalyst (3.4 mg, 0.005 mmol, 1 mol %), magnesium chips (14.5 mg, 0.6 mmol), p-tert-butylchlorobenzene (84 μl, 0.5 mmol), p-fluorochlorobenzyl (72 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), the yield was 92%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.30 (d, J=8.2 Hz, 2H), 7.17-7.05 (m, 4H), 6.96 (t, J=8.7 Hz, 2H), 3.91 (s, 2H), 1.30 (s, 9H) ppm.

Example 24: Ni(NHC)[P(OR)$_3$]X$_2$ (R=CH$_2$CH$_3$, X=Br) Catalyzed Cross-Coupling Reaction of fluorobenzene and p-methylbenzyl chloride Under argon protection, catalyst (6.8 mg, 0.010 mmol, 2 mol %), magnesium chips (14.5 mg, 0.6 mmol), fluorobenzene (47 μl, 0.5 mmol), p-methylbenzyl chloride (80 μl, 0.6 mmol), tetrahydrofuran (1.0 ml) were sequentially added to the reaction flask, and had reacted at 50° C. for 10 h, then had quenched with saturated ammonium chloride solution. The product was extracted with ethyl acetate and purified by column chromatography (with petroleum as a developing solvent), and the yield was 92%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.30-7.21 (m, 2H), 7.19-7.12 (m, 3H), 7.07 (s, 4H), 3.92 (s, 2H), 2.29 (s, 3H) ppm.

Example 25: Ni(NHC)[P(OR)$_3$]X$_2$ (R=CH$_2$CH$_3$, X=Br) Catalyzed Cross-Coupling Reaction of p-methylfluorobenzene and p-methylbenzyl chloride Under argon protection, catalyst (6.8 mg, 0.010 mmol, 2 mol %), magnesium chips (14.5 mg, 0.6 mmol), p-methylfluorobenzene (55 μl, 0.5 mmol), p-methylbenzyl chloride (80 μl, 0.6 mmol), tetrahydrofuran (1.0 ml) were sequentially added to the reaction flask, and had reacted at 50° C. for 10 h, then had quenched with saturated ammonium chloride solution. The product was extracted with ethyl acetate and purified by column chromatography (with petroleum as a developing solvent), and the yield was 92%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.06 (s, 8H), 3.88 (s, 2H), 2.30 (s, 6H) ppm.

Example 26: Ni(NHC)[P(OR)$_3$]X$_2$ (R═CH$_2$CH$_3$, X═Br) Catalyzed Cross-Coupling Reaction of p-methoxyfluorobenzene and p-methylbenzyl chloride Under argon protection, catalyst (6.8 mg, 0.010 mmol, 2 mol %), magnesium chips (14.5 mg, 0.6 mmol), p-methoxyfluorobenzene (57 μl, 0.5 mmol), p-methylbenzyl chloride (80 μl, 0.6 mmol), tetrahydrofuran (1.0 ml) were sequentially added to the reaction flask, and had reacted at 40° C. for 12 h, then had quenched with saturated ammonium chloride solution. The product was extracted with ethyl acetate and purified by column chromatography (with petroleum as a developing solvent), and the yield was 90%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.15-7.00 (m, 6H), 6.81 (d, J=8.6 Hz, 2H), 3.87 (s, 2H), 3.75 (s, 3H), 2.30 (s, 3H) ppm.

Example 27: Ni(NHC)[P(OR)$_3$]X$_2$ (R═CH$_2$CH$_3$, X═Br) Catalyzed Cross-Coupling Reaction of o-methylfluorobenzene and p-methylbenzyl chloride Under argon protection, catalyst (6.8 mg, 0.010 mmol, 2 mol %), magnesium chips (14.5 mg, 0.6 mmol), o-methylfluorobenzene (55 μl, 0.5 mmol), p-methylbenzyl chloride (80 μl, 0.6 mmol), tetrahydrofuran (1.0 ml) were sequentially added to the reaction flask, and had reacted at 60° C. for 12 h, then had quenched with saturated ammonium chloride solution. The product was extracted with ethyl acetate and purified by column chromatography (with petroleum as a developing solvent), and the yield was 95%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.16-7.02 (m, 6H), 7.00-6.96(m, 2H), 3.92 (s, 2H), 2.29 (s, 3H), 2.22 (s, 3H) ppm.

Example 28: Ni(NHC)[P(OR)$_3$]X$_2$ (R═CH$_2$CH$_3$, X═Br) Catalyzed Cross-Coupling Reaction of 1-fluoronaphthalene and p-methylbenzyl chloride Under argon protection, catalyst (6.8 mg, 0.010 mmol, 2 mol %), magnesium chips (14.5 mg, 0.6 mmol), 1-fluoronaphthalene (56 μl, 0.5 mmol), p-methylbenzyl chloride (80 μl, 0.6 mmol), tetrahydrofuran (1.0 ml) were sequentially added to the reaction flask, and had reacted at 65° C. for 10 h, then had quenched with saturated ammonium chloride solution. The product was extracted with ethyl acetate and purified by column chromatography (the mixed solvent with the volume ratio of ethyl acetate/petroleum was 1:50 as developing solvent), and the yield was 98%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 8.03-7.94 (m, 1H), 7.88-7.78 (m, 1H), 7.74-7.72 (m, 1H), 7.48-7.35 (m, 3H), 7.26-7.25(m, 1H), 7.11-7.07 (m, 2H), 6.81-6.78 (m, 2H), 4.37 (s, 2H), 2.29 (s, 3H) ppm.

Example 29: Ni(NHC)[P(OR)$_3$]X$_2$ (R═CH$_2$CH$_3$, X═Br) Catalyzed Cross-Coupling Reaction of fluorobenzene and p-tert-butylbenzyl chloride Under argon protection, catalyst (6.8 mg, 0.010 mmol, 2 mol %), magnesium chips (14.5 mg, 0.6 mmol), fluorobenzene (47 μl, 0.5 mmol), p-tert-butylbenzyl chloride (97 μl, 0.6 mmol), tetrahydrofuran (1.0 ml) were sequentially added to the reaction flask, and had reacted at 50° C. for 10 h, then had quenched with saturated ammonium chloride solution. The product was extracted with ethyl acetate and purified by column chromatography (with petroleum as a developing solvent), the yield was 93%.

The product had been dissolved in CDCl$_3$ (ca. 0.4 mL), sealed, and characterized on Unity Inova-400 NMR apparatus at room temperature: $^1$H NMR (400 MHz, CDCl$_3$): δ 7.31-7.21 (m, 4H), 7.17-7.10 (m, 3H), 7.13-7.07 (m, 2H), 3.96 (s, 2H), 1.28 (s, 9H) ppm.

Example 30: Ni(IPr)(PPh$_3$)X$_2$ (X═Br) Catalyzed Cross-Coupling Reaction of chlorobenzene and p-methylbenzyl chloride Under argon protection, catalyst (4.4 mg, 0.005 mmol, 1 mol %), magnesium chips (14.5 mg, 0.6 mmol), chlorobenzene (51 μl, 0.5 mmol), p-methylbenzyl chloride (80 μl, 0.6 mmol), tetrahydrofuran (1.0 ml) were sequentially added to the reaction flask, and had reacted at 50° C. for 1 h, then had quenched with saturated ammonium chloride solution. The product was extracted with ethyl acetate and purified by column chromatography (with petroleum as a developing solvent), and the separation yield was 49%, and the separation yield of the self-coupling by-product of p-methylbenzyl chloride was 40%.

The structure of the catalyst Ni(IPr)(PPh$_3$)X$_2$ (X═Br) is shown below.

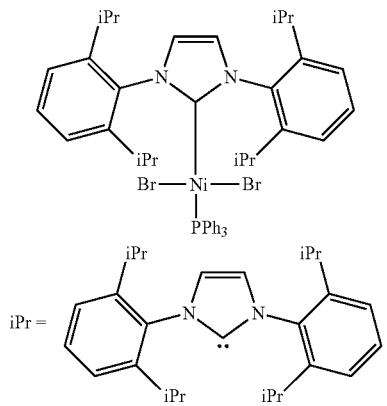

Bisoxazoline-derived nitrogen heterocyclic carbene, which has special structural characteristic. It has not been reported as a ligand in nickel complexes, especially the mixed Ni(II) complex containing bisoxazoline-derived nitrogen heterocyclic carbene ligand and phosphite ligand is a new type of Ni(II) complex, which has not been reported in the literature so far. At the first time the invention discloses a mixed Ni(II) complex containing bisoxazoline-derived nitrogen heterocyclic carbene ligand and phosphite ligand, which can catalyze at a single temperature in the presence of magnesium shavings reductive cross-coupling reactions of low-activity chlorinated aromatic hydrocarbons and fluorinated aromatic hydrocarbons with chlorinated benzyl compounds to synthesize diarylmethane compounds in one step. Its catalytic activity and substrate applicability are equivalent to or higher than those of the prior art. The operability is also significantly better than the existing technology.

The invention claimed is:

1. A mixed Ni(II) complexes containing bisoxazoline-derived nitrogen heterocyclic carbene ligand and phosphite ligand, having the following structure:

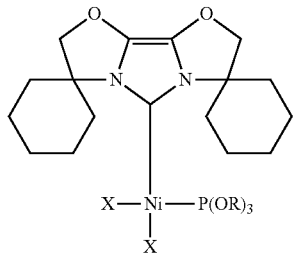

wherein, R is ethyl or isopropyl; X is bromine or chlorine.

2. The mixed Ni(II) complexes containing bisoxazoline-derived nitrogen heterocyclic carbene ligand and phosphite ligand according to claim 1, wherein a preparation method therefor comprises the following steps:
reacting bis(phosphite) Ni(II) dibromide with NHC to obtain the mixed Ni(II) complexes containing bisoxazoline-derived nitrogen heterocyclic carbene ligand and phosphite ligand,
reacting bis(phosphite) Ni(II) dichloride with NHC to obtain the mixed Ni(II) complexes containing bisoxazoline-derived nitrogen heterocyclic carbene ligand and phosphite ligand,
the NHC has the following structural formula:

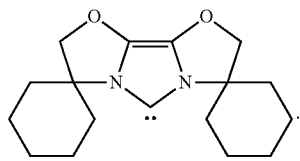

3. The mixed Ni(II) complexes containing bisoxazoline-derived nitrogen heterocyclic carbene ligand and phosphite ligand according to claim 2, wherein the reaction is carried out in a solvent without active hydrogen.

4. The mixed Ni(II) complexes containing bisoxazoline-derived nitrogen heterocyclic carbene ligand and phosphite ligand according to claim 2, wherein the bis(phosphite) Ni(II) dibromide is di(triethyl phosphite) nickel dibromide (II) or di(triisopropyl phosphite) nickel dibromide (II);
the bis(phosphite) Ni(II) dichloride is di(triethyl phosphite) nickel dichloride (II) or di(triisopropyl phosphite) nickel dichloride (II).

5. The mixed Ni(II) complexes containing bisoxazoline-derived nitrogen heterocyclic carbene ligand and phosphite ligand according to claim 2, wherein the reaction is conducted at room temperature for 3 to 5 hours.

6. The mixed Ni(II) complexes containing bisoxazoline-derived nitrogen heterocyclic carbene ligand and phosphite ligand according to claim 2, wherein a molar ratio of bis(phosphite) Ni(II) dibromide to NHC is 1 to 1; a molar ratio of bis(phosphite) Ni(II) dichloride to NHC is 1 to 1.

* * * * *